(12) United States Patent
Ahn et al.

(10) Patent No.: US 8,254,705 B2
(45) Date of Patent: Aug. 28, 2012

(54) METHOD AND APPARATUS FOR ENCODING/DECODING GRAPHIC DATA

(75) Inventors: Jeong-hwan Ahn, Suwon-si (KR); Mahn-jin Han, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 13/067,882

(22) Filed: Jul. 1, 2011

(65) Prior Publication Data

US 2012/0002891 A1 Jan. 5, 2012

Related U.S. Application Data

(63) Continuation of application No. 11/652,042, filed on Jan. 11, 2007, now Pat. No. 8,000,540.

(60) Provisional application No. 60/757,878, filed on Jan. 11, 2006, provisional application No. 60/786,381, filed on Mar. 28, 2006.

(30) Foreign Application Priority Data

May 30, 2006 (KR) .................. 10-2006-0049029

(51) Int. Cl.
*G06K 9/36* (2006.01)
(52) U.S. Cl. .................. 382/232; 382/233; 382/245
(58) Field of Classification Search .................. 382/232, 382/233, 245; 370/337; 455/418, 466; 345/419, 345/473; 358/1.15; 375/E7.077; 709/205, 709/206
See application file for complete search history.

(56) References Cited

U.S. PATENT DOCUMENTS

| | | | |
|---|---|---|---|
| 5,818,463 A | 10/1998 | Tao et al. | 345/473 |
| 6,498,936 B1 | 12/2002 | Raith | 455/466 |
| 7,409,428 B1 * | 8/2008 | Brabec et al. | 709/206 |
| 7,561,745 B2 | 7/2009 | Jang et al. | 382/232 |
| 7,751,630 B2 | 7/2010 | Strom et al. | 332/232 |
| 2001/0028744 A1 | 10/2001 | Han et al. | 382/232 |
| 2003/0218606 A1 | 11/2003 | Zhirkov et al. | 345/420 |
| 2007/0160306 A1 | 7/2007 | Ahn et al. | 382/232 |

FOREIGN PATENT DOCUMENTS

EP 0859339 A2 8/1998

(Continued)

OTHER PUBLICATIONS

U.S. Appl. No. 11/652,042, filed Jan. 11, 2007, Jeong-hwan Ahn et al., Samsung Electronics Co., Ltd.

(Continued)

*Primary Examiner* — Anh Hong Do
(74) *Attorney, Agent, or Firm* — Staas & Halsey, LLP

(57) ABSTRACT

A graphic data encoding method and apparatus generating a bitstream by encoding a header having at least one piece of first information determined in consideration of a predetermined graphic profile from among multiple pieces of encodable first information; and encoding a payload having at least one piece of second information determined in consideration of the predetermined graphic profile from among multiple pieces of encodable second information. A graphic data decoding method and apparatus decode the generated bitstream. Irrespective of the functions that can be performed by the graphic data encoding apparatus and the functions that can be performed by the graphic data decoding apparatus, the graphic data decoding apparatus, which is in accordance with a graphic profile, can completely restore a 3D mesh model described in the bitstream generated by the graphic data encoding apparatus that is satisfactory to the graphic profile.

6 Claims, 39 Drawing Sheets

FOREIGN PATENT DOCUMENTS

| EP | 0859339 A3 | 1/1999 |
|---|---|---|
| EP | 1 077 431 A1 | 2/2001 |
| EP | 1134702 A2 | 9/2001 |
| EP | 1 145 474 B1 | 6/2006 |

OTHER PUBLICATIONS

PCT International Search Report and Written Opinion issued Apr. 1, 2007 in corresponding PCT Application No. PCT/KR2007/000194.

Office Action issued in Parent U.S. Appl. No. 11/652,042 dated May 26, 2010.

United Kingdom Office Action issued Jun. 25, 2010 in corresponding British Patent Application GB0811714.5.

Office Action issued in Parent U.S. Appl. No. 11/652,042 dated Nov. 9, 2010.

Office Action issued in Parent U.S. Appl. No. 11/652,042 dated Mar. 1, 2011.

Notice of Allowance issued in Parent U.S. Appl. No. 11/652,042 dated Apr. 4, 2011.

U.K. Examination Report dated Apr. 13, 2011 issued in corresponding U.K. Patent Application No. GB0811714.5.

U.K. Combined Search and Examination dated Apr. 13, 2011 issued in related U.K. Patent Application No. GB1105052.3.

Patrick Giolia, editor. "Coding of Moving Pictures and Audio Information", Working Draft of ISO/IEC 14496-16/AM2, International Organisation for Standardisation. Oct. 2005, pp. i-xiii, 1-70.

Jens-Rainer Ohm, et al., "Coding of Moving Pictures and Audio", Text of 14496-2 Third Edition, International Organisation for Standardisation. Mar. 2003, pp. ii-xxii, 1-724.

* cited by examiner

FIG. 6

| | No. of bits | Mnemonic |
|---|---|---|
| 3D_Mesh_Object () { | | |
|   3D_MO_start_code | 16 | uimsbf |
|   3D_Mesh_Object_Header() | | |
|   do { | | |
|     3D_Mesh_Object_Layer() | | |
|   } while (nextbits_bytealigned() == 3D_MOL_start_code) | | |
| } | | |

FIG. 7

| 3D_Mesh_Object_Header() { | No. of bits | Mnemonic |
|---|---|---|
| ccw | 1 | bslbf |
| convex | 1 | bslbf |
| solid | 1 | bslbf |
| creaseAngle | 6 | uimsbf |
| coord_header() | | |
| normal_header() | | |
| color_header() | | |
| texCoord_header() | | |
| 3DMC_extension | 1 | bslbf |
| if (3DMC_extension == '1') | | |
| 3DMC_extension_header() | | |
| } | | |

FIG. 8

| | No. of bits | Mnemonic |
|---|---|---|
| coord_header() { | | |
|   coord_binding | 2 | uimsbf |
|   coord_bbox | 1 | bslbf |
|   if (coord_bbox == '1') { | | |
|     coord_xmin | 32 | bslbf |
|     coord_ymin | 32 | bslbf |
|     coord_zmin | 32 | bslbf |
|     coord_size | 32 | bslbf |
|   } | | |
|   coord_quant | 5 | uimsbf |
|   coord_pred_type | 2 | uimsbf |
|   if (coord_pred_type=="tree_prediction" \|\| coord_pred_type=="parallelogram_prediction") { | | |
|     coord_nlambda | 2 | uimsbf |
|     for (i=1; i<coord_nlambda; i++) | | |
|       coord_lambda | 4-27 | simsbf |
|   } | | |
| } | | |

FIG. 9

| normal_header() { | No. of bits | Mnemonic |
|---|---|---|
|   normal_binding | 2 | uimsbf |
|   if (normal_binding != "not_bound") { | | |
|     normal_bbox | 1 | bslbf |
|     normal_quant | 5 | uimsbf |
|     normal_pred_type | 2 | uimsbf |
|     if (normal_pred_type=="tree_prediction"\|\| | | |
|     normal_pred_type=="parallelogram_prediction") { | | |
|       normal_nlambda | 2 | uimsbf |
|       for (i=1; i<normal_nlambda; i++) | | |
|         normal_lambda | 3-17 | simsbf |
|     } | | |
|   } | | |
| } | | |

FIG. 10

| | No. of bits | Mnemonic |
|---|---|---|
| color_header() { | | |
|   color_binding | 2 | uimsbf |
|   if (color_binding != "not_bound") { | | |
|     color_bbox | 1 | bslbf |
|     if (color_bbox == '1') { | | |
|       color_rmin | 32 | bslbf |
|       color_gmin | 32 | bslbf |
|       color_bmin | 32 | bslbf |
|       color_size | 32 | bslbf |
|     } | | |
|     color_quant | 5 | uimsbf |
|     color_pred_type | 2 | uimsbf |
|     if (color_pred_type=="tree_prediction" \|\| color_pred_type=="parallelogram_prediction") { | | |
|       color_nlambda | 2 | uimsbf |
|       for (i=1; i<color_nlambda; i++) | | |
|         color_lambda | 4-19 | simsbf |
|     } | | |
|   } | | |
| } | | |

FIG. 11

| | No. of bits | Mnemonic |
|---|---|---|
| texCoord_header() { | | |
| texCoord_binding | 2 | uimsbf |
| if (texCoord_binding != "not_bound") { | | |
| texCoord_bbox | 1 | bslbf |
| if (texCoord_bbox == '1') { | | |
| texCoord_umin | 32 | bslbf |
| texCoord_vmin | 32 | bslbf |
| texCoord_size | 32 | bslbf |
| } | | |
| texCoord_quant | 5 | uimsbf |
| texCoord_pred_type | 2 | uimsbf |
| if (texCoord_pred_type=="tree_prediction" \|\| texCoord_pred_type=="parallelogram_prediction") { | | |
| texCoord_nlambda | 2 | uimsbf |
| for (i=1; i<texCoord_nlambda; i++) | | |
| texCoord_lambda | 4-19 | simsbf |
| } | | |
| } | | |
| } | | |

FIG. 12

| 3DMC_extension_header() { | No. of bits | Mnemonic |
|---|---|---|
| do { | | |
|     function_type | 4 | uimsbf |
|     if (function_type == "Order_mode") | | |
|         Order_mode_header () | | |
|     else if (function_type == "Adaptive_quant_texCoord_mode") | | |
|         Adaptive_quant_texCoord_mode_header() | | |
| } while(function_type != "Escape_mode") | | |
| } | | |

FIG. 13

| function_type_code | function_type |
|---|---|
| 0000 | Order_mode |
| 0001 | Adaptive_quant_texCoord_mode |
| 0010~1110 | Reserved |
| 1111 | Escape code |

FIG. 14

| Order_mode_header () { | No. of bits | Mnemonic |
|---|---|---|
| vertex_order_flag | 1 | bslbf |
| if(vertex_order_flag ) | | |
| vertex_order_per_CC_flag | 1 | bslbf |
| face_order_flag | 1 | bslbf |
| if(face_order_flag) | | |
| face_order_per_CC_flag | 1 | bslbf |
| } | | |

FIG. 15

| Adaptive_quant_texCoord_mode_header () { | No. of bits | Mnemonic |
|---|---|---|
| texCoord_quant_u | 16 | uimsbf |
| texCoord_quant_v | 16 | uimsbf |
| } | | |

FIG. 16

| | No. of bits | Mnemonic |
|---|---|---|
| HQ_mode_header () { | | |
| HQ_coord_enable | 1 | bslbf |
| if(HQ_coord_enable) | | |
| coord_significant_figure_value | 4 | uimsbf |
| HQ_normal_enable | 1 | bslbf |
| if(HQ_normal_enable) | | |
| normal_significant_figure_value | 4 | uimsbf |
| HQ_color_enable | 1 | bslbf |
| if(HQ_color_enable) | | |
| color_significant_figure_value | 4 | uimsbf |
| HQ_texCoord_enable | 1 | bslbf |
| if(HQ_texCoord_enable) | | |
| texCoord_significant_figure_value | 4 | uimsbf |
| } | | |

FIG. 17

| 3D_Mesh_Object_Layer () { | No. of bits | Mnemonic |
|---|---|---|
| 3D_MOL_start_code | 16 | uimsbf |
| mol_id | 8 | uimsbf |
| if (mol_id == 0) | | |
| 3D_Mesh_Object_Base_Layer() | | |
| else | | |
| 3D_Mesh_Object_Extension_Layer() | | |
| } | | |

FIG. 18

| 3D_Mesh_Object_Base_Layer() { | No. of bits | Mnemonic |
|---|---|---|
|     do { | | |
|         3D_MOBL_start_code | 16 | uimsbf |
|         mobl_id | 8 | uimsbf |
|         while (!bytealigned()) | | |
|             one_bit | 1 | bslbf |
|         qf_start() | | |
|         if (3D_MOBL_start_code == "partition_type_0") { | | |
|             do { | | |
|         connected_component() | | |
|         qf_decode(last_component, last_component_context) | | vlclbf |
|         } while (last_component == '0') | | |
|         } | | |
|         else if (3D_MOBL_start_code == "partition_type_1") { | | |
|             vg_number=0 | | |
|             do { | | |
|                 vertex_graph() | | |
|             vg_number++ | | |
|             qf_decode(has_stitches, has_stitches_context) | | vlclbf |
|             qf_decode(codap_last_vg, codap_last_vg_context) | | vlclbf |
|         } while (codap_last_vg == '0') | | |
|         } | | |
|         else if (3D_MOBL_start_code == "partition_type_2") { | | |
|             if(vg_number > 1) | | |
|                 qf_decode(codap_vg_id) | | Vlclbf |
|             qf_decode(codap_left_bloop_idx) | | Vlclbf |
|             qf_decode(codap_right_bloop_idx) | | Vlclbf |
|             qf_decode(codap_bdry_pred) | | Vlclbf |
|             triangle_tree() | | |
|             triangle_data() | | |
|         } | | |
|     } while (nextbits_bytealigned() == 3D_MOBL_start_code) | | |
|     if (has_stitches) | | |
|         stitching() | | |
| } | | |

FIG. 19

| | No. of bits | Mnemonic |
|---|---|---|
| connected_component() { | | |
| vertex_graph() | | |
| qf_decode(has_stitches, has_stitches_context) | | vlclbf |
| triangle_tree() | | |
| triangle_data() | | |
| } | | |

FIG. 20

| vertex_graph() { | No. of bits | Mnemonic |
|---|---|---|
|     qf_decode(vg_simple, vg_simple_context) | | vlclbf |
|     depth = 0 | | |
|     code_last = '1' | | |
|     openloops = 0 | | |
|     do { | | |
|         do { | | |
|             if (code_last == '1') { | | |
|                 qf_decode(vg_last, vg_last_context) | | vlclbf |
|                 if (openloops > 0) { | | |
|                     qf_decode(vg_forward_run, vg_forward_run_context) | | vlclbf |
|                     if (vg_forward_run == '0') { | | |
|                         openloops-- | | |
|                         if (openloops > 0) | | |
|                             qf_decode(vg_loop_index, vg_loop_index_context) | | vlclbf |
|                         break | | |
|                     } | | |
|                 } | | |
|             } | | |
|             qf_decode(vg_run_length, vg_run_length_context) | | vlclbf |
|             qf_decode(vg_leaf, vg_leaf_context) | | vlclbf |
|             if (vg_leaf == '1' && vg_simple == '0') { | | |
|                 qf_decode(vg_loop, vg_loop_context) | | vlclbf |
|                 if (vg_loop == '1') | | |
|                     openloops++ | | |
|             } | | |
|         } while (0) | | |
|         if (vg_leaf == '1' && vg_last == '1' && code_last == '1') | | |
|             depth-- | | |
|         if (vg_leaf == '0' && (vg_last == '0' || code_last == '0')) | | |
|             depth++ | | |
|         code_last = vg_leaf | | |
|     } while (depth >= 0) | | |
| } | | |

FIG. 21

| triangle_tree() { | No. of bits | Mnemonic |
|---|---|---|
| depth = 0 | | |
| ntriangles = 0 | | |
| branch_position = -2 | | |
| do { | | |
|     qf_decode(tt_run_length, tt_run_length_context) | | vlclbf |
|     ntriangles += tt_run_length | | |
|     qf_decode(tt_leaf, tt_leaf_context) | | vlclbf |
|     if (tt_leaf == '1') { | | |
|         depth-- | | |
|     } | | |
|     else { | | |
|         branch_position = ntriangles | | |
|         depth++ | | |
|     } | | |
| } while (depth >= 0) | | |
| if (3D_MOBL_start_code == "partition_type_2") | | |
|     if (codap_right_bloop_idx – codap_left_bloop_idx – 1 > ntriangles) { | | |
|         if (branch_position == ntriangles – 2) { | | |
|             qf_decode(codap_branch_len, codap_branch_len_context) | | vlclbf |
|             ntriangles -= 2 | | |
|         } | | |
|         else | | |
|             ntriangles-- | | |
| } | | |
| } | | |

FIG. 22

| | No. of bits | Mnemonic |
|---|---|---|
| triangle_data(i) { | | |
| qf_decode(triangulated, triangulated_context) | | vlclbf |
| depth=0 | | |
| root_triangle() | | |
| for (i=1; i<ntriangles; i++) | | |
| triangle(i) | | |
| } | | |

FIG. 23

| | No. of bits | Mnemonic |
|---|---|---|
| root_triangle() { | | |
|   if (marching_triangle) | | |
|     qf_decode(marching_pattern, | | vlclbf |
|       marching_pattern_context[marching_pattern]) | | |
|   else { | | |
|     if (3D_MOBL_start_code == "partition_type_2") | | |
|     if (tt_leaf == '0' && depth==0) | | |
|       qf_decode(td_orientation, td_orientation_context) | | vlclbf |
|     if (tt_leaf == '0') | | |
|       depth++ | | |
|     else | | |
|       depth-- | | |
|   } | | |
|   if (3D_MOBL_start_code == "partition_type_2") | | |
|   if (triangulated == '0') | | |
|     qf_decode(polygon_edge, | | vlclbf |
|       polygon_edge_context[polygon_edge]) | | |
|   root_coord() | | |
|   root_normal() | | |
|   root_color() | | |
|   root_texCoord() | | |
| } | | |

FIG. 24

| | No. of bits | Mnemonic |
|---|---|---|
| root_coord() { | | |
|   if (3D_MOBL_start_code == "partition_type_2") { | | |
|     if (visited[vertex_index] == 0) { | | |
|       root_coord_sample() | | |
|     if (visited[vertex_index] == 0) { | | |
|       coord_sample() | | |
|       coord_sample() | | |
|     } | | |
|   } | | |
|   else { | | |
|     root_coord_sample() | | |
|     coord_sample() | | |
|     coord_sample() | | |
|   } | | |
| } | | |

FIG. 25

| | No. of bits | Mnemonic |
|---|---|---|
| root_normal() { | | |
|   if (normal_binding != "not bound") | | |
|     if (3D_MOBL_start_code == "partition_type_2") { | | |
|       if (normal_binding != "bound_per_vertex" \|\|<br>      visited[vertex_index] == 0) { | | |
|         root_normal_sample() | | |
|       if (normal_binding != "bound_per_face" &&<br>      (normal_binding != "bound_per_vertex" \|\|<br>      visited[vertex_index] == 0)) { | | |
|         normal_sample() | | |
|         normal_sample() | | |
|       } | | |
|     } | | |
|     else { | | |
|       root_normal_sample() | | |
|       if (normal_binding != "bound_per_face") { | | |
|         normal_sample() | | |
|         normal_sample() | | |
|       } | | |
|     } | | |
|   } | | |

FIG. 26

| | No. of bits | Mnemonic |
|---|---|---|
| root_color() { | | |
|   if (color_binding != "not_bound") | | |
|     if (3D_MOBL_start_code == "partition_type_2") { | | |
|       if (color_binding != "bound_per_vertex" \|\| <br>        visited[vertex_index] == 0) { | | |
|         root_color_sample() | | |
|       if (color_binding != "bound_per_face" && <br>        (color_binding != "bound_per_vertex" \|\| <br>        visited[vertex_index] == 0)) { | | |
|         color_sample() | | |
|         color_sample() | | |
|       } | | |
|     else { | | |
|       root_color_sample() | | |
|       if (color_binding != "bound_per_face") { | | |
|         color_sample() | | |
|         color_sample() | | |
|       } | | |
|     } | | |
| } | | |

FIG. 27

| | No. of bits | Mnemonic |
|---|---|---|
| root_texCoord() { | | |
|   if (texCoord_binding != "not bound") | | |
|     if (3D_MOBL_start_code == "partition_type_2") { | | |
|       if (texCoord_binding != "bound_per_vertex" \|\| visited[vertex_index] == 0) { | | |
|         root_texCoord_sample() | | |
|       if (texCoord_binding != "bound_per_vertex" \|\| visited[vertex_index] == 0) { | | |
|         texCoord_sample() | | |
|         texCoord_sample() | | |
|       } | | |
|     else { | | |
|       root_texCoord_sample() | | |
|       texCoord_sample() | | |
|       texCoord_sample() | | |
|     } | | |
| } | | |

FIG. 28

| | No. of bits | Mnemonic |
|---|---|---|
| triangle(i) { | | |
|   if (marching_triangle) | | |
|     qf_decode(marching_edge, marching_edge_context[marching_edge]) | | vlclbf |
|   else { | | |
|     if (3D_MOBL_start_code == "partition_type_2") | | |
|       if (tt_leaf == '0' && depth==0) | | |
|         qf_decode(td_orientation, td_orientation_context) | | vlclbf |
|     if (tt_leaf == '0') | | |
|       depth++ | | |
|     else | | |
|       depth-- | | |
|   if (triangulated == '0') | | |
|     qf_decode(polygon_edge, polygon_edge_context[polygon_edge]) | | vlclbf |
|   coord() | | |
|   normal() | | |
|   color() | | |
|   texCoord() | | |
| } | | |

FIG. 29

| | No. of bits | Mnemonic |
|---|---|---|
| coord() { | | |
|   if (3D_MOBL_start_code == "partition_type_2") { | | |
|     if (visited[vertex_index] == 0) | | |
|       if (no_ancestors) | | |
|         root_coord_sample() | | |
|       else | | |
|         coord_sample() | | |
|   } | | |
|   else { | | |
|     if (visited[vertex_index] == 0) | | |
|       coord_sample() | | |
|   } | | |
| } | | |

FIG. 30

| | No. of bits | Mnemonic |
|---|---|---|
| root_coord_sample() { | | |
|   for (i=0; i<3; i++) | | |
|     for (j=0; j<coord_quant; j++) | | |
|       qf_decode(coord_bit, zero_context) | | vlclbf |
| } | | |

FIG. 31

| | No. of bits | Mnemonic |
|---|---|---|
| coord_sample() { | | |
|   for (i=0; i<3; i++) { | | |
|     j=0 | | |
|     do { | | |
|       qf_decode(coord_leading_bit, coord_leading_bit_context[3*j+i]) | | vlclbf |
|       j++ | | |
|     } while (j<coord_quant && coord_leading_bit == '0') | | |
|     if (coord_leading_bit == '1') { | | |
|       qf_decode(coord_sign_bit, zero_context) | | vlclbf |
|       do { | | |
|         qf_decode(coord_trailing_bit, zero_context) | | vlclbf |
|       } while (j<coord_quant) | | |
|     } | | |
|   } | | |
| } | | |

FIG. 32

| | No. of bits | Mnemonic |
|---|---|---|
| normal() { | | |
|   if (normal_binding == "bound_per_vertex") { | | |
|     if (3D_MOBL_start_code == "partition_type_2") { | | |
|       if (visited[vertex_index] == 0) | | |
|         if (no_ancestors) | | |
|           root_normal_sample() | | |
|         else | | |
|           normal_sample() | | |
|     } | | |
|     else { | | |
|       if (visited[vertex_index] == 0) | | |
|         normal_sample() | | |
|     } | | |
|   } else if (normal_binding == "bound_per_face") { | | |
|     if (triangulated == '1' || polygon_edge == '1') | | |
|       normal_sample() | | |
|   } else if (normal_binding == "bound_per_corner") { | | |
|     if (triangulated == '1' || polygon_edge == '1') { | | |
|       normal_sample() | | |
|       normal_sample() | | |
|     } | | |
|     normal_sample() | | |
|   } | | |
| } | | |

FIG. 33

| | No. of bits | Mnemonic |
|---|---|---|
| root_normal_sample() { | | |
|   for (i=0; i<1; i++) { | | |
|     for (j=0; j<normal_quant; j++) | | |
|       qf_decode(normal_bit, zero_context) | | vlclbf |
| } | | |

FIG. 34

| | No. of bits | Mnemonic |
|---|---|---|
| normal_sample() { | | |
|   for (i=0; i<1; i++) { | | |
|     j=0 | | |
|     do { | | |
|       qf_decode(normal_leading_bit, normal_leading_bit_context[j]) | | vlclbf |
|       j++ | | |
|     } while (j<normal_quant && normal_leading_bit == '0') | | |
|     if (normal_leading_bit == '1') { | | |
|       qf_decode(normal_sign_bit, zero_context) | | vlclbf |
|       do { | | |
|         qf_decode(normal_trailing_bit, zero_context) | | vlclbf |
|       } while (j<normal_quant) | | |
|     } | | |
| } | | |

FIG. 35

| | No. of bits | Mnemonic |
|---|---|---|
| color() { | | |
|   if (color_binding == "bound_per_vertex") { | | |
|     if (3D_MOBL_start_code == "partition_type_2") { | | |
|       if (visited[vertex_index] == 0) | | |
|         if (no_ancestors) | | |
|           root_color_sample() | | |
|         else | | |
|           color_sample() | | |
|     } | | |
|     else { | | |
|       if (visited[vertex_index] == 0) | | |
|         color_sample() | | |
|     } | | |
|   } else if (color_binding == "bound_per_face") { | | |
|     if (triangulated == '1' || polygon_edge == '1') | | |
|       color_sample() | | |
|   } else if (color_binding == "bound_per_corner") { | | |
|     if (triangulated == '1' || polygon_edge == '1') { | | |
|       color_sample() | | |
|       color_sample() | | |
|     } | | |
|     color_sample() | | |
|   } | | |
| } | | |

FIG. 36

| | No. of bits | Mnemonic |
|---|---|---|
| root_color_sample() { | | |
|   for (i=0; i<3; i++) | | |
|     for (j=0; j<color_quant; j++) | | |
|       qf_decode(color_bit, zero_context) | | vlclbf |
| } | | |

FIG. 37

| | No. of bits | Mnemonic |
|---|---|---|
| color_sample() { | | |
|   for (i=0; i<3; i++) { | | |
|     j=0 | | |
|     do { | | |
|       qf_decode(color_leading_bit, color_leading_bit_context[3*j+i]) | | vlclbf |
|       j++ | | |
|     } while (j<color_quant && color_leading_bit == '0') | | |
|     if (color_leading_bit == '1') { | | |
|       qf_decode(color_sign_bit, zero_context) | | vlclbf |
|       do { | | |
|         qf_decode(color_trailing_bit, zero_context) | | vlclbf |
|       } while (j<color_quant) | | |
|     } | | |
|   } | | |
| } | | |

FIG. 38

| | No. of bits | Mnemonic |
|---|---|---|
| texCoord() { | | |
|   if (texCoord_binding == "bound_per_vertex") { | | |
|     if (3D_MOBL_start_code == "partition_type_2") { | | |
|       if (visited[vertex_index] == 0) { | | |
|         if (no_ancestors) | | |
|           root_texCoord_sample() | | |
|         else | | |
|           texCoord_sample() | | |
|       } | | |
|     } else { | | |
|       if (visited[vertex_index] == 0) | | |
|         texCoord_sample() | | |
|     } | | |
|   } else if (texCoord_binding == "bound_per_corner") { | | |
|     if (triangulated == '1' || polygon_edge == '1') { | | |
|       texCoord_sample() | | |
|       texCoord_sample() | | |
|     } | | |
|     texCoord_sample() | | |
|   } | | |

FIG. 39

| root_texCoord_sample() { | No. of bits | Mnemonic |
|---|---|---|
| for (i=0; i<2; i++) { | | |
| for (j=0; j<texCoord_quant; j++) { | | |
| qf_decode(texCoord_bit, zero_context) | | vlclbf |
| } | | |

FIG. 40

| texCoord_sample() { | No. of bits | Mnemonic |
|---|---|---|
| for (i=0; i<2; i++) { | | |
| j=0 | | |
| do { | | |
| qf_decode(texCoord_leading_bit, texCoord_leading_bit_context[2*j+i]) | | vlclbf |
| j++ | | |
| } while (j<texCoord_quant && texCoord_leading_bit == '0') | | |
| if (texCoord_leading_bit == '1') { | | |
| qf_decode(texCoord_sign_bit, zero_context) | | vlclbf |
| do { | | |
| qf_decode(texCoord_trailing_bit, zero_context) | | vlclbf |
| } while (j<texCoord_quant) | | |
| } | | |
| } | | |

FIG. 41

| stitching() { | No. of bits | Mnemonic |
|---|---|---|
| has_vertex_increase | 1 | bslbf |
| has_face_increase | 1 | bslbf |
| if (has_vertex_increase) { | | |
| n_vertex_stitches | bitsPerVField | |
| for(int i = 0; i < n_vertex_stitches; i++){ | | |
| n_duplication_per_vertex_stitches | bitsPerVField | |
| for( int j = 0; j < n_duplication_per_vertex_stitches; j++) { | | |
| vertex_index | bitsPerVField | |
| } | | |
| } | | |
| } | | |
| if (has_face_increase){ | | |
| n_face_stitches | bitsPerFField | |
| for(int i = 0; i < n_face_stitches; i++){ | | |
| n_duplication_per_face_stitches | bitsPerFField | |
| for( int j = 0; j < n_duplication_per_face_stitches; j++){ | | |
| face_index | bitsPerFField | |
| } | | |
| } | | |
| } | | |
| } | | |

FIG. 42

| | No. of bits | Mnemonic |
|---|---|---|
| 3D_Mesh_Object_Extension_Layer() { | | |
| if(vertex_order_flag ) | | |
| { | | |
| if(vertex_order_per_CC_flag) | | |
| vertex_order_per_CC() | | |
| vertex_order() | | |
| } | | |
| if(face_order_flag) | | |
| { | | |
| if(face_order_per_CC_flag) | | |
| Face_order_per_CC() | | |
| face_order() | | |
| } | | |
| } | | |

FIG. 43

| | No. of bits | Mnemonic |
|---|---|---|
| vertex_order() { | | |
| for(i=0; i < nCC; i++) | | |
| for(bpvi=init_bpvi; bpvi >0; bpvi --) | | |
| for(j=DecodingVertices;j>0;j--) | | |
| vo_decode( vo_id,bpvi) | bpvi | uimsbf |
| } | | |
| } | | |

FIG. 44

| | No. of bits | Mnemonic |
|---|---|---|
| face_order () { | | |
| for(i=0;i < nCC; i++) | | |
| for(bpfi =init_bpfi; bpfi >0; bpfi --) | | |
| for(j=DecodingFaces;j>0;j--) | | |
| fo_decode(fo_id, bpfi) | bpfi | uimsbf |
| ~ | | |
| ~ | | |

FIG. 45

| vertex_order_per_CC() { | No. of bits | Mnemonic |
|---|---|---|
| for(i=0;i<nCC;i++) { | | |
| nVOffset | 16 | uimsbf |
| for (j=0;j<nVOffset;j++) | | |
| { | | |
| vo_offset | 24 | uimsbf |
| firstVID | 24 | uimsbf |
| } | | |
| } | | |
| } | | |

FIG. 46

| face_order_per_CC() { | No. of bits | Mnemonic |
|---|---|---|
| for(i=0;i<nCC;i++) { | | |
| nFOffset | 16 | uimsbf |
| for (j=0;j<nFOffset;j++) | | |
| { | | |
| fo_offset | 24 | uimsbf |
| firstFID | 24 | uimsbf |
| } | | |
| } | | |
| } | | |

METHOD AND APPARATUS FOR ENCODING/DECODING GRAPHIC DATA

CROSS-REFERENCE TO RELATED APPLICATIONS

This application is a continuation application of application Ser. No. 11/652,042 filed Jan. 11, 2007, now U.S. Pat. No. 8,000,540, which claims the benefit of U.S. Provisional Application No. 60/757,878, filed on Jan. 11, 2006, and No. 60/786,381, filed on Mar. 28, 2006, and Korean Patent Application No. 10-2006-0049029, filed on May 30, 2006, in the Korean Intellectual Property Office, the disclosures of which are incorporated herein in their entirety by reference.

BACKGROUND OF THE INVENTION

1. Field of the Invention

The present invention relates to graphic data, and more particularly, to compression and decompression of the graphic data.

2. Description of the Related Art 3-dimensional (3D) mesh models expressed in 3D by a plurality of vertices and faces formed by the vertices are widely used in various multimedia application fields, such as 3D games, 3D modeling, animation, etc. Various methods of encoding and decoding model data of such a 3D mesh model are suggested. Bitstreams, which are generated by encoding using various methods, may have different formats. Accordingly, a method of completely decoding a bitstream irrespective of an encoding method used to generate the bitstream is required.

SUMMARY OF THE INVENTION

Additional aspects and/or advantages of the invention will be set forth in part in the description which follows and, in part, will be apparent from the description, or may be learned by practice of the invention.

The present invention provides a graphic data encoding method and apparatus that enable a bitstream to be completely decoded irrespective of an encoding method used to generate the bitstream.

The present invention provides a graphic data decoding method and apparatus for completely decoding a bitstream irrespective of an encoding method used to generate the bitstream.

The present invention provides a computer readable recording medium storing therein graphic data described in a format that enables a bitstream to be completely decoded irrespective of an encoding method used to generate the bitstream.

According to an aspect of the present invention, there is provided a graphic data encoding method comprising: (a) encoding a header having at least one piece of first information determined in consideration of a predetermined graphic profile from among multiple pieces of encodable first information; and (b) encoding a payload having at least one piece of second information determined in consideration of the predetermined graphic profile from among multiple pieces of encodable second information.

According to another aspect of the present invention, there is provided a graphic data encoding apparatus comprising: a header encoding unit that encodes a header having at least one piece of first information determined in consideration of a predetermined graphic profile from among multiple pieces of encodable first information; and a payload encoding unit that encodes a payload having at least one piece of second information determined in consideration of the predetermined graphic profile from among multiple pieces of encodable second information.

According to another aspect of the present invention, there is provided a graphic data decoding method comprising: decoding a header having at least one piece of first information determined in consideration of a predetermined graphic profile; and decoding a payload having at least one piece of second information determined in consideration of the predetermined graphic profile.

According to another aspect of the present invention, there is provided a graphic data decoding apparatus comprising: a header decoding unit that decodes a header having at least one piece of first information determined in consideration of a predetermined graphic profile; and a payload decoding unit that decodes a payload having at least one piece of second information that is determined in consideration of the predetermined graphic profile, in consideration of the decoded first information.

According to another aspect of the present invention, there is provided a computer readable medium storing graphic data comprising: a header including at least one piece of first information that is inevitably included irrespective of the graphic profile, and at least one piece of first information that is optionally included according to the graphic profile; and a payload including at least one piece of second information that is inevitably included irrespective of the graphic profile, and at least one piece of second information that is optionally included according to the graphic profile.

BRIEF DESCRIPTION OF THE DRAWINGS

The above and other features and advantages of the present invention will become more apparent by describing in detail exemplary embodiments thereof with reference to the attached drawings in which:

FIG. 6 shows syntax indicating graphic data according to an embodiment of the present invention;

FIG. 7 shows syntax of a header of the graphic data in FIG. 6;

FIGS. 8 through 11 show syntaxes for explaining a base header of the header in FIG. 7;

FIG. 12 shows syntax of an extension header of the header in FIG. 7;

FIG. 13 is a table for explaining 'function_type' in FIG. 12;

FIGS. 14 through 16 show syntaxes for explaining an extension header of the header in FIG. 7;

FIG. 17 shows syntax indicating a payload of the graphic data in FIG. 6;

FIG. 18 shows syntax indicating a base payload of the payload in FIG. 17;

FIGS. 19 through 41 show syntaxes for explaining the base payload in FIG. 18;

FIG. 42 shows syntax indicating an extension payload of the payload in FIG. 7;

FIGS. 43 through 46 show syntaxes for explaining the extension payload in FIG. 42;

DETAILED DESCRIPTION OF THE PREFERRED EMBODIMENTS

Figure 1:
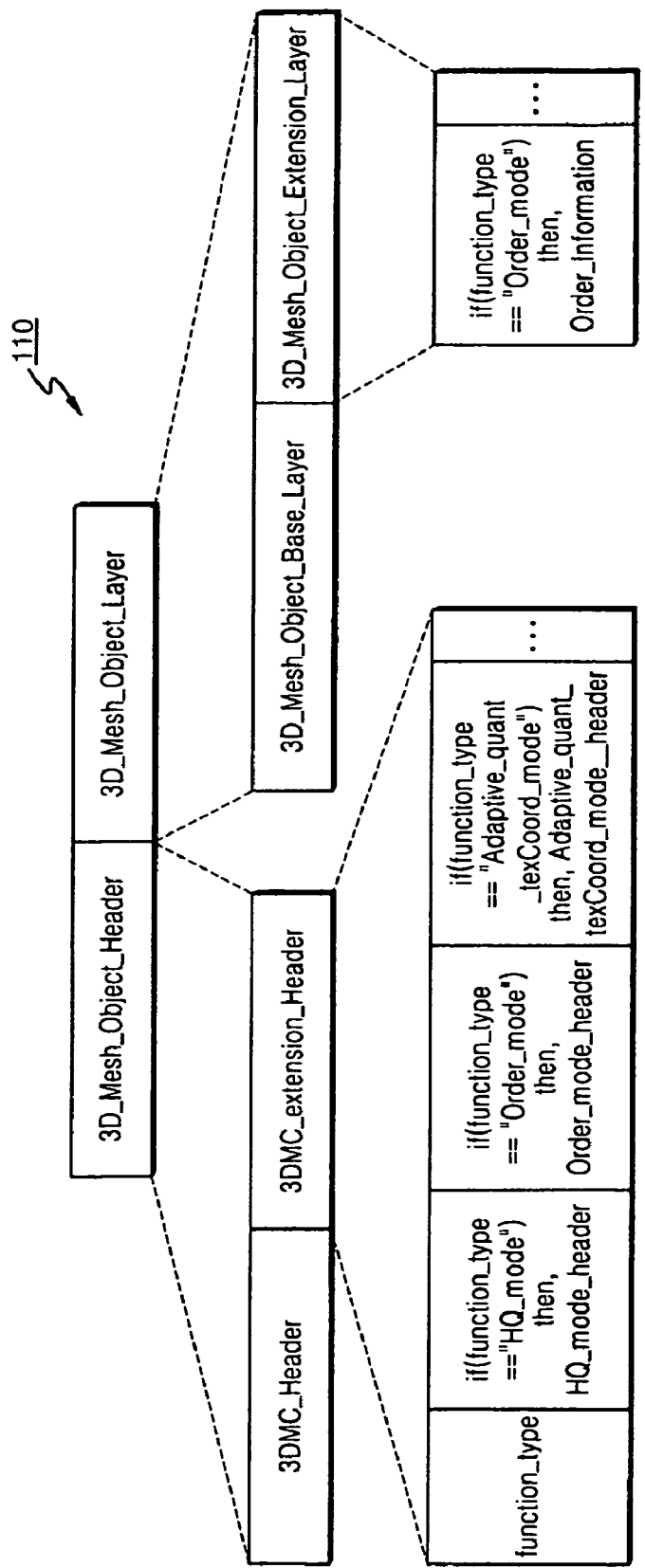
FIG. 1 shows a graphic data format according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

Methods and apparatuses for encoding and decoding graphic data according to embodiments of the present invention will be described with reference to the appended drawings.

Figure 2A:
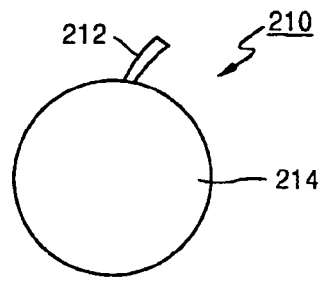
FIGS. 2A and 2B are reference figures for explaining an error-resilience function and an incremental rendering function.
Figure 2B:
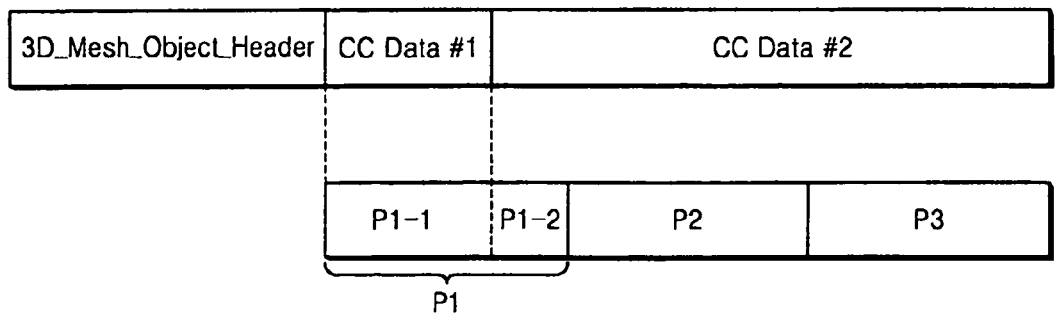
Figure 3A:
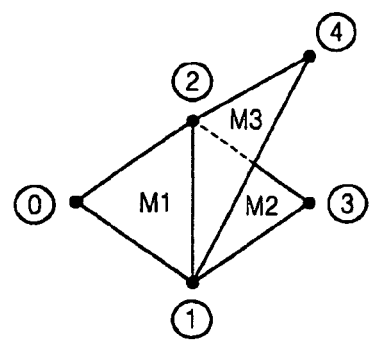
FIGS. 3A through 3C are reference figures for explaining a stitch function.
Figure 3B:
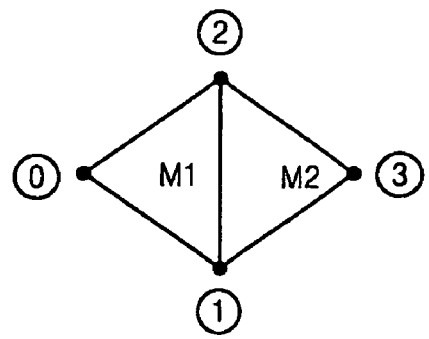
Figure 3C:
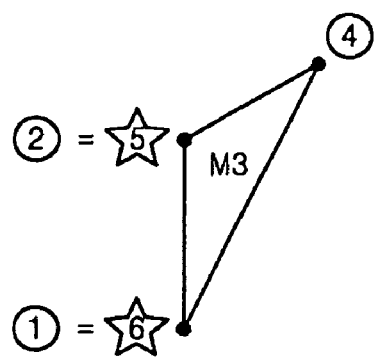

FIG. 1 shows a graphic data format according to an embodiment of the present invention that is an example of a bitstream 110 generated by a graphic data encoding apparatus according to an embodiment of the present invention. FIGS. 2A and 2B are reference figures for explaining an error-resilience function and a incremental rendering function. FIGS. 3A through 3C are reference figures for explaining a stitch function.

In the specification, model data can be expressed as a combination of geometry information, connectivity information, and attribute information. Here, geometry information refers to the position of each vertex in a 3D mesh model, connectivity information refers to a geometrical connection structure between the vertices, and attribute information refers to the color of each vertex, each face, or each corner, the normal of each face, and a texture coordinate mapped to each vertex. Here, the corner refers a corner on a face, and the texture coordinate refers to a coordinate on a 2D texture image that will be covered by the 3D mesh model.

Such model data can be expressed according to the VRML (Virtual Reality Modeling Language) standard or can be BIFS (Binary Format for Scenes) data according to the MPEG (Moving Picture Experts Group)-4 standard based on VRML.

A graphic data encoding apparatus according to an embodiment of the present invention can encode model data according to various methods, and a graphic data decoding apparatus according to an embodiment of the present invention can decode the bitstream 110 according to various methods. Throughout the specification, additional information refers to information describing such various methods. Accordingly, a graphic data encoding apparatus according to an embodiment of the present invention can encode graphic data together with at least one piece of additional information. In other words, a graphic data encoding apparatus according to an embodiment of the present invention can generate the bitstream 110 including model data and at least one piece of additional information. In this case, a graphic data decoding apparatus according to an embodiment of the present invention decodes the bitstream 110 so as to restore the model data and at least one piece of additional information. Throughout the specification, graphic data collectively refers to model data and at least one piece of additional information.

Additional information may refer to information used to compress and restore model data according to various methods, and model data may refer to information used for rendering according to various methods. Such additional information may refer to information on functions supported by a graphic profile, which is in accordance with a graphic data encoding apparatus according to an embodiment of the present invention. Here, the graphic profile refers to a profile involved in encoding and decoding graphic data, and a profile refers to a set of functions involved in encoding and decoding graphic data.

AFX (Animation Framework eXtension), an AHG (Ad-Hoc Group) of 3DGC (3-Dimensional Graphic Compression), which is an MPEG-4 sub-group, prescribes a graphic profile called "Core 3D Compression Profile". Here, 3DGC is also referred to as SNHC (Synthetic Natural Hybrid Coding). A graphic profile consists of a plurality of object types, and an object type refers to an encoding/decoding tool with a specific function(s) collected from among a plurality of functions supported by a graphic profile. Object types constituting a Core 3D Compression Profile include Simple 3DMC (3-Dimensional Mesh Coding), Simple CI (CoordinateInterpolator), Simple PI (PositionInterpolator), Simple OI (OrientationInterpolator), Simple WSS (Wavelet Subdivision Surface), etc. Here, Simple 3DMC is a tool supporting geometry information compression/decompression function, a connectivity information compression/decompression function, an attribute information compression/decompression function, an error-resilience function, and an incremental rendering.

A graphic data encoding apparatus according to an embodiment of the present invention, which is in accordance with the Core 3D Compression Profile can perform a geometry information compression/decompression function, a connectivity information compression/decompression function, an attribute information compression/decompression function, an error-resilience function, and an incremental rendering function. When encoding model data, the graphic data encoding apparatus encodes the model data together with multiple pieces of additional information. Multiple pieces of additional information include information on a geometry information compression/decompression function, a connectivity information compression/decompression function, an attribute information compression/decompression function, an error-resilience function, and an incremental rendering function. Here, the geometry information compression/decompression function means a function of compressing/decompressing the geometry information of model data. The connectivity information compression/decompression function means a function of compressing/decompressing the connectivity information of model data. The attribute information compression/decompression function means a function of compressing/decompressing the attribute information of model data. On the other hand, the error-resilience function and the incremental rendering function are functions considered when one 3D mesh model 210 is treated as a combination of partial models 212 and 214 as illustrated in FIGS. 2A and 2B. In this case, model data (CC Data #1+CC Data #2) consist of a plurality of partitions P1, P2, and P3. Here, CC Data #1 is data indicating the partial model 212, and CC Data #2 is data indicating the partial model 214. In particular, CC Data #1 corresponds to P1-1 of partition P1, and CC Data #2 corresponds to P1-2 of partition P1, and partitions P2 and P3. The data capacities of the partitions P1, P2, and P4 are the same). For example, the number of bits expressing each of the partitions P1, P2, and P3 is the same. To this end, CC Data #2 expressing a single partial model 214 may correspond to a plurality of partitions, i.e., a part of partition P1 and partitions P2 and P3. Data, which is CC Data #1 and a part of CC Data

2, expressing a plurality of partial models may correspond to a single partition P1. The error-resilience function means a function that enables a decoder to restart decoding and rendering from just a partition of the bitstream 110 in which an error has occurred, not the entire bitstream 110, when the error has occurred in a part of the bitstream 110, to be exact in a part of the partitions of the bitstream 110, during the transmission of the bitstream 110 to the decoder. In addition, the incremental rendering function means a function that enables a decoder, which receives the bitstream 110 having a plurality of partitions, to perform decoding and rendering starting from a partition which has been received, not after the entire bitstream 110 has been received.

Although a graphic data encoding/decoding apparatus according to an embodiment of the present invention, which is in accordance with the Core 3D Compression Profile can perform only the geometry information compression/decompression function, the connectivity information compression/decompression function, and the attribute information compression/decompression function, graphic data encoding/decoding apparatuses according to other embodiments of the present invention can perform other various functions, in addition to the above-listed functions.

For example, a graphic profile with an object type of 3DMC disclosed in ISO (International Organization for Standardization)/IEC (International Electrotechnical Commission) 14496-2 can support at least one more function, in addition to five functions supported by the Core 3D Compression Profile. In particular, 3DMC can additionally support a progressive function, a Ce_SNHC function, a stitch function, etc. Here, the progressive function refers to a function that enables a decoder which has received the bitstream 110 to decode the entire bitstream 110 and perform rendering of model data while progressively increasing the resolution. The Ce_SNHC function refers to a function of controlling the data capacity of model data in consideration of the size of a 3D mesh model to be displayed on a screen after rendering. The stitch function refers to a function that enables the encoder to encode, where at least three faces M1, M2, and M3 share one edge (for example, the line between vertex 1 and vertex 2), at least some of the faces that are separated from the at least three faces so that a maximum of two faces share one edge (for example, line between a vertex 1 and a vertex 2), so as to generate the bitstream 110, and that enables the decoder to restore the 3D mesh model by decoding the bitstream 110 so that the separated faces are combined so as to return to their inherent state. In particular, when encoding model data as shown in FIG. 3A, a graphic data encoding apparatus according to an embodiment of the present invention separates the face M3 from the faces M1 and M2 so that a maximum of two faces share one edge between the vertex 1 and the vertex 2, as shown in FIGS. 3B and 3C. In this case, the vertices of the separated face M3 no longer include the vertex 1, the vertex 2, and the vertex 4. In other words, in a case where the face M3 is separated from the faces M1 and M2, the graphic data encoding apparatus according to an embodiment of the present invention treats the vertex 1 and the vertex 2 among the vertices of the separated face M3 as new vertices (for example, vertex 5 and vertex 6) distinguished from the inherently existing vertices (i.e., vertex 0, vertex 1, through to vertex 4). When the face M3 is separated from the faces M1 and M2 as in this case, the graphic data encoding apparatus according to an embodiment of the present invention, which has the stitch function, separately encodes the model data of FIG. 3B and the model data of FIG. 3C. Similarly, a graphic data decoding apparatus according to an embodiment of the present invention, which has the stitch function, restores the model data of FIG. 3A so that the edge between the vertex 5 and the vertex 6 of the separated face M3 becomes the edge between the vertex 2 and the vertex 1 of the faces M1 and M2, i.e., so that the face M3 is combined with the faces M1 and M2. As shown in FIGS. 3A through 3C, 'additional information on the stitch function' that is encoded by the graphic data encoding apparatus according to an embodiment of the present invention may have information indicating that the model data of the three vertices of the face M3 is encoded with the vertex 1 treated as the vertex 6 and the vertex 2 treated as the vertex 5 and is decoded with the vertex 5 treated as the vertex 2 and the vertex 6 treated with the vertex 1. Throughout this specification, an edge means a line between two adjacent vertices.

As another example, a graphic profile with an object type of a 3DMC extension which does not support some of the functions supported by 3DMC and additionally supports some other functions not supported by 3DMC is suggested in this specification. The progressive function and the Ce_SNHC function are examples of functions which are supported by 3DMC but not by the 3DMC extension. An order information maintaining function, a lossless compression/decompression function, and an improved texture mapping function are examples of functions which are not supported by 3DMC but are supported by the 3DMC extension. In particular, in the case where an encoder generates the bitstream 110 by encoding a 3D mesh model after changing at least one of the order of vertices and the order of the faces that constitute the 3D mesh model in order to increase the compression rate, it is difficult for the decoder (for example, a decoder that recognizes 'a face consisting of vertex a, vertex b, and vertex c', 'a face consisting of vertex b, vertex c, and vertex a', 'a face consisting of vertex c, vertex a, and vertex b', and 'a face consisting of vertex a, vertex c, and vertex b' as different faces) to restore the 3D mesh model exactly to it's inherent state. In this case, an order information maintaining function enables the encoder to encode information on at least one of the order of the vertices and the order of the faces that is treated as additional information, together with the model data, and enables the decoder to decode the bitstream 110 in consideration of the inherent order information so as to restore the 3D mesh model in which the inherent orders of the vertices and the faces are maintained. The lossless compression/decompression function refers to a function that enables the encoder and the decoder to perform lossless (lossless or near-lossless) compression/decompression on the model data (to be exact, geometry information and attribute information of the model data) by using significant figures. The improved texture mapping function refers to a function of texture-mapping of the 3D mesh model with 2D texture images in consideration of the data capacity of the texture images as well as a normalized texture coordinate to be mapped onto each vertex.

Irrespective of a graphic profile, which is in accordance with the graphic data encoding apparatus according to an embodiment of the present invention, graphic data according to an embodiment of the present invention always consists of a heater and a payload. The payload is also referred to as a body. Throughout this specification, first information means additional information provided in the header, and second information means additional information provided in the payload.

Referring to FIG. 1, 3D_Mesh_Object_Header means a header of graphic data according to an embodiment of the present invention, and 3D_Mesh_Object_Layer means a payload of the graphic data according to an embodiment of the present invention.

The header of the graphic data according to an embodiment of the present invention includes at least one piece of first information determined in consideration of a predetermined graphic profile. The payload of the graphic data according to an embodiment of the present invention includes at least one piece of second information determined in consideration of a predetermined graphic profile. Throughout the specification, a predetermined graphic profile means any one of graphic profiles, which is in accordance with a graphic data encoding/decoding apparatus according to an embodiment of the present invention. Examples of such a predetermined graphic profile include a Core 3D Compression Profile, a graphic profile with 3DMC, and a graphic profile with a 3DMC extension.

A header of graphic data according to an embodiment of the present invention may include at least one piece of first information which is inevitably included irrespective of a predetermined graphic profile and at least one piece of first information which is optionally included according to a predetermined graphic profile. In a similar way, a payload of graphic data according to an embodiment of the present invention may include at least one piece of second information which is inevitably included irrespective of a predetermined graphic profile and at least one piece of second information which is optionally included according to a predetermined graphic profile.

The graphic data according to an embodiment of the present invention, as illustrated in FIG. 1, is an example provided only for convenience of explanation, and FIGS. 4 through 46 will be described in connection with exemplary graphic data according to an embodiment of the present invention.

As illustrated in FIG. 1, at least one piece of first information which is inevitably included in a predetermined graphic profile includes additional information on the functions supported by Simple 3DMC. At least one piece of second information which is inevitably included in a predetermined graphic profile includes 'model data' and 'additional information included in the payload on functions supported by Simple 3DMC'. In this case, the header (to be exact, encoded header) and the payload (to be exact, encoded payload) of the bitstream 110 generated by a graphic data encoding apparatus according to an embodiment of the present invention, which is in accordance with a graphic profile with 3DMC, include first and second information, respectively, regarding the functions supported by Simple 3DMC. In a similar manner, a header and a payload of a bitstream 110 generated by a graphic data encoding apparatus according to an embodiment of the present invention, which is in accordance with a graphic profile with 3DMC extension, include first information and second information, respectively, on the functions supported by Simple 3DMC.

In addition, as illustrated in FIG. 1, first information that is optionally included according to a predetermined graphic profile includes first information prescribing the inherent functions of the predetermined graphic profile, first information on the lossless compression/decompression function, first information on the order information maintaining function, and first information on the improved texture mapping function. In this case, unlike the header of the bitstream 110 generated by a graphic data encoding apparatus according to an embodiment of the present invention, which is in accordance with a 'Core 3D Compression Profile' or 'a graphic profile with 3DMC', the header of the bitstream 110 generated by a graphic data encoding apparatus, which is in accordance with a graphic profile with 3DMC extension, includes first information prescribing the inherent functions of the graphic profile with 3DMC extension (for example, the lossless compression/decompression function the order information maintaining function, and the improved texture mapping function), first information on the lossless compression/decompression function, first information on the order information maintaining function, and first information on the improved texture mapping function.

In addition, as illustrated in FIG. 1, second information that is optionally included according to a predetermined graphic profile includes second information on the stitch function and second information on the order information maintaining function. In this case, unlike the payload of the bitstream 110 generated by a graphic data encoding apparatus according to an embodiment of the present invention, which is to the Core 3D Compression Profile, the payload of the bitstream 110 generated by a graphic data encoding apparatus according to an embodiment of the present invention, which is in accordance with a graphic profile with 3DMC includes second information on the stitch function. Unlike the payload of the bitstream 110 generated by a graphic data encoding apparatus according to an embodiment of the present invention, which is in accordance with the Core 3D Compression Profile or a graphic profile with 3DMC, the payload of the bitstream 110 generated by a graphic data encoding apparatus, which is in accordance with a graphic profile with 3DMC extension, includes second information on the stitch function and second information on the order information maintaining function.

3DMC_Header, 3DMC_extension_Header, 3D_Mesh_Object_Base_Layer, and 3D_Mesh_Object_Extension_Layer in FIG. 1 will be described below using a header (3D_Mesh_Object_Header) and a payload (3D_Mesh_Object_Layer).

The header of the bitstream 110 generated by a graphic data encoding apparatus according to an embodiment of the present invention, which is in accordance with the Core 3D Compression Profile, is a part of the 3DMC_Header. The header of the bitstream 110 generated by a graphic data encoding apparatus according to an embodiment of the present invention, which is in accordance with a graphic profile with 3DMC, is the 3DMC_Header. The header of the bitstream 110 generated by a graphic data encoding apparatus according to an embodiment of the present invention, which is in accordance with a graphic profile with the 3DMC_extension, is the 3DMC_Header+3DMC_extension_Header. However, as described above, since the 3DMC extension does not support some of the functions supported by 3DMC, the contents of 3DMC_Header included in the bitstream 110 generated by the graphic data encoding apparatus, which is in accordance with a graphic profile with 3DMC, differ from the contents of the 3DMC_Header included in the bitstream 110 generated by the graphic data encoding apparatus, which is in accordance with a graphic profile with the 3DMC_extension.

Similarly, the payload of the bitstream 10 generated by a graphic data encoding apparatus according to an embodiment of the present invention, which is in accordance with the Core 3D Compression Profile is a part of the 3D_Mesh_Object_Base_Layer. The payload of the bitstream 110 generated by a graphic data encoding apparatus according to an embodiment of the present invention, which is in accordance with a graphic profile with 3DMC, is the 3D_Mesh_Object_Base_Layer. The payload of the bitstream 110 generated by a graphic data encoding apparatus according to an embodiment of the present invention, which is in accordance with a graphic profiled with the 3DMC_extension, is the 3D_Mesh_Object_Base_Layer+3D_Mesh_Object_Extension_Layer. However, as described above, since the 3DMC extension does not support some of the functions supported by 3DMC, the contents of the 3D_Mesh_Object_Base_Layer included in the bitstream 110 generated by the graphic data encoding apparatus, which is in accordance with a graphic profile with 3DMC, differ from the contents of the 3D_Mesh_Object_Base_Layer included in the bitstream 110 generated by the graphic data encoding apparatus, which is in accordance with a graphic profile with the 3DMC_extension.

In FIG. 1, 'function_type' indicates first information prescribing functions (to be exact, functions included in the 3DMC_extension_Header) which are not supported by 3DMC but are supported by the 3DMC_extension. In addition, 'HQ_mode' means the lossless compression/decompression function, 'Order_mode' means the order information maintaining function, and 'Adaptive_quant_texCoord_mode' means the improved texture mapping function. Furthermore, 'HQ_mode_header' means first information on the lossless compression/decompression function, 'Order_mode_header' means first information on the order information maintaining function, and 'Adaptive_quant_texCoord_mode_header' means first information on the improved texture mapping function. 'Order_Information' means second information on the order information maintaining function.

Figure 4:
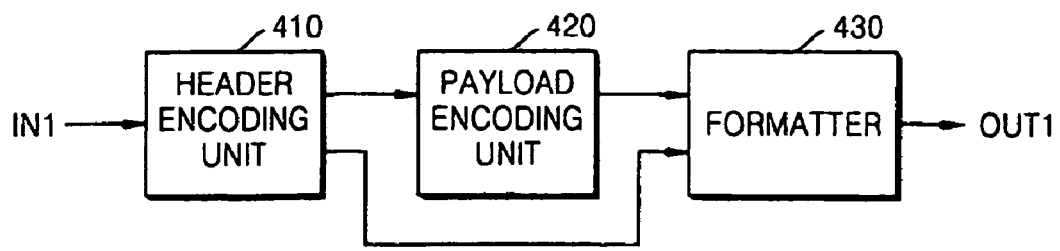
FIG. 4 is a block diagram of a graphic data encoding apparatus according to an embodiment of the present invention.

FIG. 4 is a block diagram of a graphic data encoding apparatus according to an embodiment of the present invention. The graphic data encoding apparatus includes a header encoding unit 410, a payload encoding unit 420, and a formatter 430.

The header encoding unit 410 encodes a header of graphic data input through an input terminal IN1. In particular, the header encoding unit 410 encodes the header including first information on functions supported by a graphic profile which is in accordance with the graphic data encoding apparatus, among a plurality of functions that can be performed by the graphic data encoding apparatus. In other words, the header encoding unit 410 encodes the header including at least one piece of first information that is determined from among encodable multiple pieces of first information according to the graphic profile which is in accordance with the graphic data encoding apparatus.

The payload encoding unit 420 encodes a payload of the graphic data. In particular, the payload encoding unit 420 encodes the payload including second information on functions supported by the graphic profile which is in accordance with the graphic data encoding apparatus, among the plurality of functions that can be performed by the graphic data encoding apparatus. In other words, the payload encoding unit 420 encodes the payload including at least one piece of second information that is determined from among encodable multiple pieces of second information according to the graphic profile which is in accordance with the graphic data encoding apparatus.

The formatter 430 generates a bitstream by combining the encoded result of the header encoding unit 410 and the encoded result of the payload encoding unit 420, and outputs the generated bitstream through an output terminal OUT1.

Figure 5:
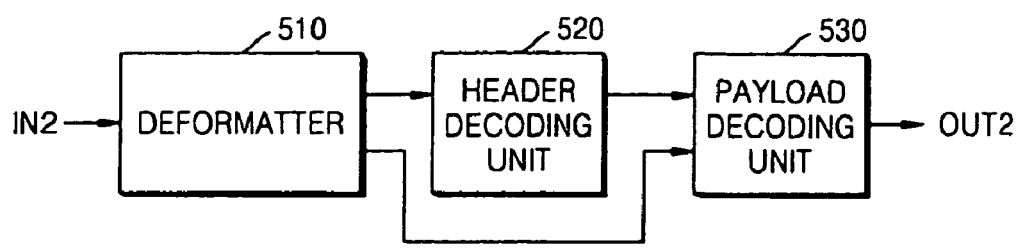
FIG. 5 is a block diagram of a graphic data decoding apparatus according to an embodiment of the present invention.

FIG. 5 is a block diagram of a graphic data decoding apparatus according to an embodiment of the present invention. The graphic data decoding apparatus includes a deformatter 510, a header decoding unit 520, and a payload decoding unit 530.

The deformatter 510 extracts 'the encoded heater' and 'the encoded payload' from the bitstream input through an input terminal IN2. Here, the bitstream input through the input terminal IN2 may be the bitstream output through the output terminal OUT1.

The header decoding unit 520 restores the header by decoding the extracted 'encoded header'. The payload decoding unit 530 restores the model data by decoding the extracted 'encoded payload' in consideration of the restored header and outputs the restored model data through an output terminal OUT2. Here, the model data output through the output terminal OUT2 may be subjected to rendering performed by a rendering unit (not shown). To this end, the graphic data decoding apparatus may include a rendering unit (not shown).

FIG. 6 shows an example of syntax indicating graphic data according to an embodiment of the present invention, and in particular, syntax indicating graphic data encoded by a graphic data encoding apparatus according to an embodiment of the present invention, which is in accordance with a graphic profile with 3DMC extension.

As shown in FIG. 6, 3D_Mesh_Object( ) means graphic data according to an embodiment of the present invention. One header (3D_Mesh_Object_Header( )) can be combined with at least one payload (3D_Mesh_Object_Layer( )).

As shown in FIG. 6, 3D_MO_start_code means information indicating the start of graphic data (3D_Mesh_Object) according to an embodiment of the present invention. 3D_MO_start_code may consist of 16 bits. For example, 3D_MO_start_code can be 0000 0000 0010 0000.

Similarly to this, 3D_MOL_start_code means information indicating the start of the payload (3D_Mesh_Object_Layer). 3D_MOL_start_code may consist of 16 bits. For example, 3D_MOL_start_code may be 0000 0000 0011 0000.

FIG. 7 shows an example of syntax indicating a header of the graphic data in FIG. 6, and in particular, syntax indicating a header of graphic data encoded by a graphic data encoding apparatus according to an embodiment of the present invention, which is in accordance with a graphic profile with a 3DMC extension. For reference, the syntax of 3D_Mesh_Object_Header( ) disclosed in 6.2.11.2 of ISO/IEC 14496-2 can be an example of the syntax indicating the header of the graphic data encoded by the graphic data encoding apparatus which is in accordance with a graphic profile with 3DMC.

Referring to FIG. 7, the header of the graphic data may consist of a base header and an extension header. Here, the base header means first information on at least one function (for example, a geometry information compression/decompression function, a connectivity information compression/decompression function, and an attribute information compression/decompression function) commonly supported by a 3DMC extension and 3DMC. ccw, convex, solid, creaseAngle, coord_header( ), normal_header( ), color_header( ), and texCoord_header( ) indicate base headers. In addition, the extension header means first information on at least one function that is not supported by 3DMC but is supported by a 3DMC extension. The 3DMC_extension, if (3DMC_extension=='1'), and 3DMC_extension_header( ) indicate extension headers.

ccw, convex, solid, and creaseAngle in FIG. 7 can be identical with, respectively, Ccw, Convex, Solid, and creaseAngle disclosed in 6.2.11.2 of ISO/IEC 14496-2. In this case, Ccw means a boolean value indicating whether the order of vertices in each face is determined counterclockwise, Convex means a boolean value indicating whether the 3D mesh model is convex or not, Solid means a boolean value indicating whether the 3D mesh model is solid or not, and creaseAngle means an unsigned 16-bit integer indicating the crease angle.

FIGS. 8 through 11 show detailed syntaxes of coord_header( ), normal_header( ), color_header( ), and texCoord_header( ) in Table 7. The syntax of coord_header( ) in FIG. 8, the syntax of normal_header( ) in FIG. 9, and the syntax of color_header( ) in FIG. 10 can be identical to the syntax of coord_header( ), the syntax of normal_header( ), and the syntax of color_header( ), respectively, disclosed in 6.2.11.2 of ISO/IEC 14496-2. The syntax of texCoord_header( ) in FIG. 11 can be the result of deleting delta_flag from the syntax of texCoord_header( ) disclosed in 6.2.11.2 of ISO/IEC 14496-2.

3DMC_extension in FIG. 7 means a boolean value indicating whether additional information on at least one function supported by the 3DMC extension exists in graphic data according to an embodiment of the present invention. If additional information on at least one function supported by the 3DMC extension exists in graphic data according to an embodiment of the present invention, i.e., if 3DMC_extension=='1', 3DMC_extension_header( ) in FIG. 12 is called.

FIG. 12 shows syntax for explaining an extension header among the headers in FIG. 7. In FIG. 12, as first information on functions which are not supported by 3DMC but are supported by a 3DMC extension, only first information (Order_mode_header( ) on the order information maintaining function (Order_mode) and first information (Adaptive_quant_texCoord_mode_header( ) on the improved texture mapping function (Adaptive_quant_texCoord_mode) are shown. However, first information on other functions may exist between 'Adaptive_quant_texCoord_mode_header( )' and '} while(function_type !="Escape_mode"))'. For example, first information (HQ_mode_header( ) on the lossless compression/decompression function (HQ_mode) may exist between 'Adaptive_quant_texCoord_mode_header( )' and '(while(function_type!="Escape_mode"))'.

FIG. 13 is a table for explaining 'function_type' in FIG. 12.

'function_type' means first information prescribing at least one function supported by a graphic profile with a 3DMC extension. In particular, 'function_type' can prescribe at least one function that is not supported by 3DMC but is supported by the 3DMC extension. As shown in FIG. 13, the order information maintaining function (Order_mode) and the improved texture mapping function (Adaptive_quant_texCoord_mode) may be included as inherent functions of 3DMC extension.

'function_type_code' means the inherent code of each function prescribed by 'function_type'. As examples of 'function_type_code' in FIG. 13, 0000 indicates the order information maintaining function (Order_mode), and 0001 indicates the improved texture mapping function (Adaptive_quant_texCoord_mode). In FIG. 13, 0010 to 1110 are reserved but can be defined as 'function_type_code' later. For example, 0010 may indicate the lossless compression/decompression function (HQ_mode). 1111 indicates an escape code.

FIG. 14 shows a detailed syntax of Order_mode_header( ) in FIG. 12.

Referring to FIG. 14, 'vertex_order_flag' means a boolean value indicating whether the order of vertices is changed as a result of encoding graphic data and whether the changed order is restored to the initial order as a result of decoding the graphic data. 'vertex_order_per_CC_flag' means a boolean value indicating whether the order of vertices is determined for each partial model to which the vertices belong.

Similarly, 'face_order_flag' means a boolean value indicating whether the order of faces is changed as a result of encoding graphic data and the changed order is restored to the inherent order as a result of decoding the graphic data. 'face_order_per_CC_flag' means a boolean value indicating whether the order of faces is determined for each partial model to which the faces belong.

A graphic data encoding/decoding apparatus according to an embodiment of the present invention, which is in accordance with a graphic profile with 3DMC extension, considers vertex_order_flag, vertex_order_per_CC_flag, face_order_flag, and face_order_per_CC_flag when performing the order information maintaining function.

FIG. 15 shows detailed syntax of Adaptive_quant_texCoord_mode_header( ) in FIG. 12.

As shown in FIG. 15, 'texCoord_quant_u' can be an unsigned 16-bit integer indicating a quantization step size in the direction of u(x) axis, which is one of the two axes, i.e., u(x) axis and v(y) axis, on a 2D texture image. In addition, 'texCoord_quant_v' can be an unsigned 16-bit integer indicating a quantization step size in the direction of v(y) axis. A graphic data encoding/decoding apparatus according to an embodiment of the present invention, which is in accordance with a graphic profile with 3DMC extension, considers texCoord_quant_u, and texCoord_quant_v when performing the improved texture mapping function.

FIG. 16 shows a detailed syntax of HQ_mode( ) which may be included in FIG. 12.

As shown in FIG. 16, 'HQ_coord_enable' means a boolean value indicating whether the lossless compression/decompression function is performed on the geometry information of model data. 'coord_significant_figure_value' means the number of significant figures of the geometry information when 'HQ_coord_enable' indicates that the lossless compression/decompression function is performed on the geometry information. For example, when 'coord_significant_figure_value' is 5 in decimal scale, the restored geometry information becomes 12.346 even if the decoded geometry information is 12.34567. When 'coord_significant_figure_value' is expressed in binary scale, it can be an unsigned 4-bit integer.

Similarly, 'HQ_normal_enable' means a boolean value indicating whether the lossless compression/decompression function is performed on the normal information among attribute information of model data. 'normal_significant_figure_value' means the number of significant figures of the normal information when 'HQ_normal_enable' indicates that the lossless compression/decompression function is performed on the normal information. For example, when 'normal_significant_figure_value' is 5 in decimal scale, the restored normal information becomes 12.346 even if the decoded normal information is 12.34567. When 'normal_significant_figure_value' is expressed in binary scale, it can be an unsigned 4-bit integer.

Similarly, 'HQ_color_enable' means a boolean value indicating whether the lossless compression/decompression function is performed on color information among attribute information of model data. 'color_significant_figure_value' means the number of significant figures of the color information when 'HQ_color_enable' indicates that the lossless compression/decompression function is performed on the color information. For example, when 'color_significant_figure_value' is 5 in decimal scale, the restored color information becomes 12.346 even if the decoded color information is 12.34567. When 'color_significant_figure_value' is expressed in binary scale, it can be an unsigned 4-bit integer.

In addition, 'HQ_texCoord_enable' means a boolean value indicating whether the lossless compression/decompression function is performed on the texture coordinate among attribute information of model data. 'texCoord_significant_figure_value' means the number of significant figures of the texture coordinate when 'HQ_texCoord_enable' indicates that the lossless compression/decompression function is performed on the texture coordinate. For example, when 'texCoord_significant_figure_value' is 5 in decimal scale, the restored texture coordinate becomes 12.346 even if the decoded texture coordinate is 12.34567. When 'texCoord_significant_figure_value' is expressed in binary scale, it can be an unsigned 4-bit integer.

A graphic data encoding/decoding apparatus according to an embodiment of the present invention, which is in accordance with a graphic profile with 3DMC extension, may consider HQ_coord_enable and coord_significant_figure_value when performing the geometry information compression function.

A graphic data encoding/decoding apparatus according to an embodiment of the present invention, which is in accordance with a graphic profile with 3DMC extension, may consider HQ_normal_enable, normal_significant_figure_value, HQ_color_enable, color_significant_figure_value, HQ_texCoord_enable, and texCoord_significant_figure_value when performing the attribute information compression function.

FIG. 17 shows syntax indicating a payload of the graphic data in FIG. 16, and in particular, an example of a syntax indicating a payload of graphic data that is encoded by a graphic data encoding apparatus according to an embodiment of the present invention, which is in accordance with a graphic profile with 3DMC extension. For reference, the syntax of 3D_Mesh_Object_Layer( ) disclosed in 6.2.11.3 of ISO/IEC 14496-2 can be an example of syntax of graphic data that is encoded by a graphic data encoding apparatus according to an embodiment of the present invention, which is in accordance with a graphic profile with 3DMC extension.

As shown in FIG. 17, the payload of the graphic data may include a base payload and an extension payload. Here, the base payload means second information on at least one function supported commonly by 3DMC extension and 3DMC. 3D_Mesh_Object_Base_Layer( ) indicates the base payload. In addition, the extension payload means second information on at least one function that is not supported by 3DMC but is supported by 3DMC extension. 3D_Mesh_Object_Extension_Layer( ) indicates the extension payload.

3D_MOL_start_code In FIG. 17 is identical to 3D_MOL_start_code in FIG. 6. 'mol_id' indicates inherent identification information of the 3D_Mesh_Object_Base_Layer and 3D_Mesh_Object_Extension_Layer. For example, when 'mol_id=0 (in decimal scale)', it indicates the 3D_Mesh_Object_Base_Layer. When 'mol_id≠0', it indicates the 3D_Mesh_Object_Extension_Layer. 'mol_id' can be expressed as an unsigned 8-bit integer.

FIG. 18 shows syntax indicating a base payload of the payload in FIG. 17. FIGS. 19 through 41 show syntaxes of the base payload in FIG. 18.

In particular, FIG. 19 is detailed syntax of connected_component( ) in FIG. 18. FIGS. 20 through 22 show detailed syntaxes of vertex_graph( ) triangle_tree( ) and triangle_data( ) in FIG. 19, respectively.

FIG. 23 shows a detailed syntax of root_triangle( ) in FIG. 22. FIGS. 24 through 27 are detailed syntaxes of root_coord( ), root_normal( ) root_color( ) and root_texCoord( ) in FIG. 23, respectively. FIG. 18 shows a detailed syntax of triangle(i) in FIG. 22.

FIG. 29 shows a detailed syntax of coord( ) in FIG. 28. FIG. 30 shows a detailed syntax of root_coord_sample( ) in FIG. 29. FIG. 31 shows a detailed syntax of coord_sample( ) in FIG. 29.

FIG. 32 shows a detailed syntax of normal( ) in FIG. 28. FIG. 33 shows a detailed syntax of root_normal_sample( ) in FIG. 32. FIG. 34 shows a detailed syntax of normal_sample( ) in FIG. 32.

FIG. 35 shows a detailed syntax of color( ) in FIG. 28. FIG. 36 shows a detailed syntax of root_color_sample( ) in FIG. 35. FIG. 37 shows a detailed syntax of color_sample( ) in FIG. 35.

FIG. 38 shows a detailed syntax of texCoord( ) in FIG. 28. FIG. 39 shows a detailed syntax of root_texCoord_sample( ) in FIG. 38. FIG. 40 shows a detailed syntax of texCoord_sample( ) in FIG. 38.

3D_MOBL_start_code, mobl_id, one_bit, partition_type_0, partition_type_1, partition_type_2, last_component, has_stitches, codap_last_vg, codap_vg_id, codap_left_bloop_idx, codap_right_bloop_idx, and codap_bdry_pred in FIG. 18 can be identical to 3D_MOBL_start_code, mobl_id, one_bit, partition_type_0, partition_type_1, partition_type_2, last_component, has_stitches, codap_last_vg, codap_vg_id, codap_left_bloop_idx, codap_right_bloop_idx, and codap_bdry_pred which are disclosed in 6.2.11.3 of ISO/IEC 14496-2.

Similarly, the syntaxes in FIGS. 9 through 40 can be identical to the detailed syntaxes of connected_component( ) vertex_graph( ) triangle_tree( ) triangle_data( ) root_triangle( ) root_coord( ) root_normal( ) root_color( ) root_texCoord( ) triangle(i), coord( ) root_coord_sample( ) coord_sample( ) normal( ) root_normal_sample( ) normal_sample( ) color( ) root_color_sample( ) color_sample( ) texCoord( ) root_texCoord_sample( ) texCoord_sample( ) which are disclosed in 6.2.11.3 of ISO/IEC 14496-2.

As shown in FIG. 41, the syntax of stitching( ) indicating second information on the stitch function may be different from the detailed syntax of stitching( ) disclosed in 6.2.11.3 of ISO/IEC 14496-2.

Referring to FIG. 41, 'has_vertex_increase' is a boolean value indicating whether the number of vertices expressing a 3D mesh model increases when graphic data is encoded. 'has_face_increase' is a boolean value indicating whether the number of faces expressing a 3D mesh model increases when graphic data is encoded. 'The number of vertices expressing a 3D mesh model increases' or 'The number of faces expressing a 3D mesh model increases' means that at least one face constituting the 3D mesh model is separated when the graphic data is encoded.

'if (has_vertex_increase){ }' means that 'if the number of vertices expressing the 3D mesh model increases when graphic data is encoded'. 'n_vertices_stitches' means the number of vertices of the 3D mesh model that belong to edges shared by at least three faces. 'n_duplication_per_vertex_stitches' means the number of duplications of each vertex that belongs to edges shared by at least three faces. 'vertex_index' means 'the inherent order' and 'at least one copied order' of each vertex. In FIGS. 3A through 3C, only vertex 1 and vertex 2 are edges shared by at least three faces. In other words, only two vertices, i.e., vertex 1 and vertex 2, belong to edges shared by at least three faces. Accordingly, n_vertices_stitches is 2. In addition, vertex 1 is identical to vertex 6, which means that there are essentially two vertices 1. Accordingly, the number of duplications of vertex 1 is 2. Similarly, vertex 2 is identical to vertex 5, which means that there are essentially two vertices 2. Accordingly, the number of duplications of vertex 2 is 2. In conclusion, 'n_duplication_per_vertex_stitches' of each of vertex 1 and vertex 2 is 2. In addition, 'vertex_index' of vertex 1 (or 6) is "1 (inherent order), 6(copied order)", and 'vertex_index' of vertex 2 (or 5) is "2 (inherent order), 5 (copied order)".

Similarly, 'if (has_face_increase){ }' means that 'if the number of faces expressing a 3D mesh model increases when graphic data is encoded'. 'n_face_stitches' means the number of faces of the 3D mesh model that include an edge shared by at least three faces. 'n_duplication_per_face_stitches' means the number of duplications of each of the faces that share one edge. 'face_index' means 'inherent order' and 'at least one copied order' of each of the faces constituting the 3D mesh model.

FIG. 42 shows syntax of an extension payload of the payload in FIG. 17. Throughout the specification, the vertex order information of each vertex constituting the 3D mesh model may means information on the 'inherent order' and 'the order to be changed by encoding' of each vertex or information on the 'inherent order' and 'a difference value between the inherent order and the order to be changed by encoding'. In addition, the face order information of each face constituting the 3D mesh model may mean information on the 'inherent order' and 'the order to be changed by encoding' of each face or information on the 'inherent order' and 'a difference value between the inherent order and the order to be changed by encoding'.

The vertex order information of the vertices constituting the 3D mesh model may be prepared independently for each partial model in the payload. Or, the vertex order information of the vertices constituting the 3D mesh model may be prepared dependently for each partial model in the payload. In the example illustrated in FIG. 2A, if the vertex order information is included for each partial model in the payload, vertex order information of the vertices constituting the partial model 212 is included independently from vertex order information of the vertices constituting the partial model 214. In other words, the vertex order information of the vertices constituting the partial model 212 is not affected by the vertex order information of the vertices constituting the partial model 214. On the contrary, in the example illustrated in FIG. 2A, if the vertex order information is not included for each partial model, the vertical order information of the vertices constituting the partial model 212 and the vertical order information of the vertices constituting the partial model 214 are not discriminated from one another. Accordingly, the vertex order information of the vertices constituting the partial model 212 is affected by the vertex order information of the vertices constituting the partial model 214.

Similarly, the face order information of the faces constituting the 3D mesh model may be prepared independently for each partial model in the payload. Or, the face order information of the faces constituting the 3D mesh model may be prepared dependently for each partial model in the payload. In the example illustrated in FIG. 2A, if the face order information is included for each partial model in the payload, the face order information of the faces constituting the partial model 212 is included independently from the face order information of the faces constituting the partial model 214. In other words, the face order information of the faces constituting the partial model 212 is not affected by the face order information of the faces constituting the partial model 214. On the contrary, in the example illustrated in FIG. 2A, if the face order information is not included for each partial model, the face order information of the faces constituting the partial model 212 and the face order information of the faces constituting the partial model 214 are not discriminated from one another. Accordingly, the face order information of the faces constituting the partial model 212 is not affected by the face order information of the faces constituting the partial model 214.

If 'vertex_order_flag' in the header indicates that 'the order of vertices is changed as a result of encoding graphic data and the changed order is restored to the inherent order as a result of decoding the graphic data', and 'vertex_order_per_CC_flag' indicates that the order of vertices is determined for each partial model to which the vertices belong, the vertex order information of the vertices constituting the 3D mesh model is prepared independently for each partial model in the payload (vertex_order_per_CC( )).

On the contrary, if 'vertex_order_flag' in the header indicates that 'the order of vertices is changed as a result of encoding graphic data and the changed order is restored to the inherent order as a result of decoding the graphic data', and 'vertex_order_per_CC_flag' indicates that the order of vertices is not determined for each partial model to which the vertices belong, the vertex order information of the vertices constituting the 3D mesh model is determined without consideration of the partial model to which the vertices belong (vertex_order( )).

On the other hand, if 'face_order_flag' in the header indicates that 'the order of faces is changed as a result of encoding graphic data and the changed order is restored to the inherent order as a result of decoding the graphic data', and 'face_order_per_CC_flag' indicates that the order of faces is determined for each partial model to which the faces belong', the face order information of the faces constituting the 3D mesh model is prepared independently for each partial model in the payload (face_order_per_CC( )).

On the contrary, if 'face_order_flag' in the header indicates that 'the order of faces is changed as a result of encoding graphic data and the changed order is restored to the inherent order as a result of decoding the graphic data', and 'face_order_per_CC_flag' indicates that the order of faces is not determined for each partial model to which the vertices belong, the face order information of the faces constituting the 3D mesh model is determined without consideration of the partial model to which the faces belong (vertex_order( )).

FIGS. 43 through 46 show syntaxes for explaining the extension payload in FIG. 42. In particular, FIG. 43 shows detailed syntax of vertex_order( ) in FIG. 42, FIG. 44 shows a detailed syntax of face_order( ) in FIG. 42, FIG. 45 shows detailed syntax of vertex_order_per_CC( ) in FIG. 42, and FIG. 46 shows detailed syntax of face_order_per_CC( ) in FIG. 42.

Referring to FIG. 43, 'nCC' means the total number of partial models constituting the 3D mesh model, 'init_bpvi' indicates the total number of vertices constituting the 3D mesh model in binary scale, 'DecodingVertices' means bit values of bits positioned in the same order from among bits indicating the orders of vertices in binary scale that are changed by encoding, and 'vo_id' means the inherent order of vertices. For example, it is assumed that the number of vertices constituting the 3D mesh model is 4, the inherent order of the vertices is 3 (11 in binary scale), 1 (01 in binary scale), 2 (10 in binary scale), and 0 (00 in binary scale), and the order of the vertices is changed to 0 (00 in binary scale), 1 (01 in binary scale), 2 (10 in binary scale), and 3 (11 in binary scale) as a result of encoding. In this case, since the number of vertices constituting the 3D mesh model is 4, the number of vertices constituting the 3D mesh model can be expressed as two bits. Accordingly, 'init_bpvi' is 2. 'bpvi' can be 2 or 1 because of 'for(bpvi=init_bpvi; bpvi>0; bpvi--)'. If 'bpvi' is 2, it means the most significant bit (MSB) of each changed order (00, 01, 10, 11). If 'bpvi' is 1, it means the least significant bit (LSB) of each changed order. When 'bpvi' is 2, 'for(i=DecodingVertices; j>0; j--), vo_decode(vo_id, bpvi)' means that the MSBs (0, 0, 1, 1) of the changed order are restored to the MSBs of the inherent order. Here, the MSBs of the changed order are 0, 0, 1, 1, and the MSBs of the restored order (initial order) are 1, 0, 1, 0. Similarly, when 'bpvi' is 1, 'for(i=DecodingVertices; j>0; j--), vo_decode(vo_id, bpvi)' means the LSBs (0, 1, 0, 1) of the changed order are restored to the LSBs of the inherent order. Here, the LSBs of the changed order are 0, 1, 0, 1, and the LSBs of the restored order (initial order) are 1, 1, 0, 0.

FIG. 44 will be described under the same principle as applied to describe FIG. 43.

Referring to FIG. 44, nCC means the total number of partial models constituting the 3D mesh model, 'init_bpvi' indicates the total number of faces constituting the 3D mesh model in binary scale, 'DecodingFaces' mean bit values of bits positioned in the same order from among bits indicating the orders of faces in binary scale that are changed by encoding, and means the inherent order of the faces.

Referring to FIG. 45, 'nVOffset' means the number of offset values given to each partial model. 'vo_offset' means an offset value, which is determined according to the number of vertices that belong to other partial models. 'firstVID' means the order of the first vertex among the vertices constituting the partial model. FIG. 45 will be described with reference to FIG. 2A. For convenience of explanation, it is assumed that the number of offset values given to each of the partial models 212 and 214 is 1 (nVOffset=1), the number of vertices constituting the partial model 212 is 3, the number of vertices constituting the partial model 214 is 10, the inherent order of the vertices constituting the partial model 212 is 2, 0, and 1, and the inherent order of the vertices constituting the partial model 214 is 4, 0, 1, 2, 7, 8, 3, 6, 9, and 5. In this case, in order to restore the 3D mesh model 210 in which the partial model 214 and the partial model 212 are combined, the inherent order of the vertices constituting the partial model 214 should be changed not to the order only considering all the vertices in the partial model 214 but to the order considering all the vertices in the 3D mesh model 210. Accordingly, the inherent order of the vertices constituting the partial model 214 is changed to the result obtained by adding the number of the vertices, i.e., 3, constituting the partial model 212 to the inherent orders of the vertices of the partial model 214. Accordingly, 'vo_offset' is 3, and 'firstVID' is 4.

FIG. 46 will be described by the same principle as were applied to describe FIG. 45.

Referring to FIG. 46, 'nFOffset' means the number of offset values given to each partial model. 'fo_offset' means an offset value, which is determined according to the number of faces that belong to other partial models. 'firstFID' means the order of the first face among the faces constituting the partial model.

Figure 47:
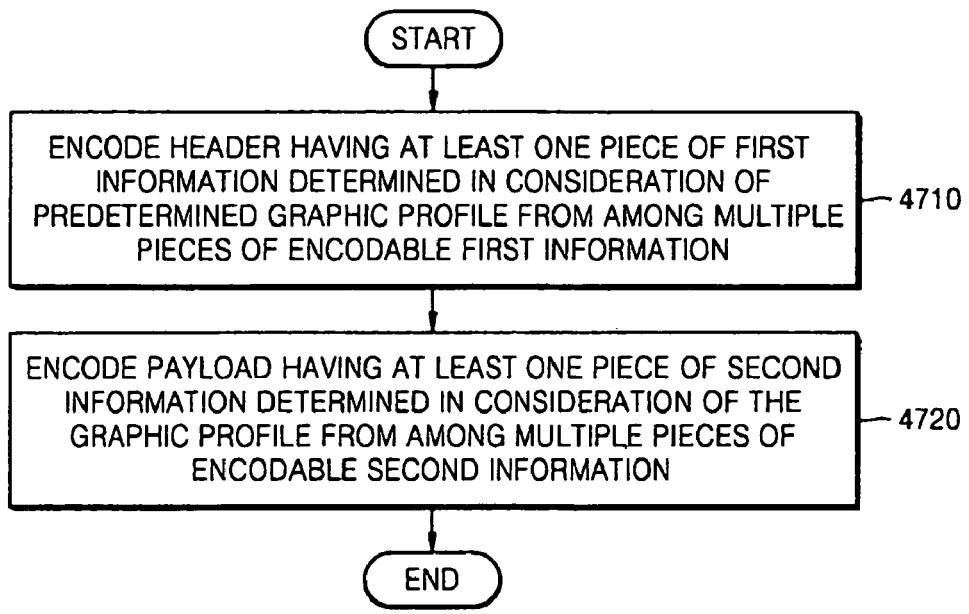
FIG. 47 is a flowchart of a graphic data encoding method according to an embodiment of the present invention.

FIG. 47 is a flowchart of a graphic data encoding method according to an embodiment of the present invention.

The header encoding unit 410 encodes a header having at least one piece of first information determined in consideration of a predetermined graphic profile from among multiple pieces of encodable first information (operation 4710).

After operation 4710, the payload encoding unit 420 encodes a payload having at least one piece of second information determined in consideration of a predetermined graphic profile from among multiple pieces of encodable second information (operation 4720).

The result of encoding in operation 4710 and the result of encoding in operation 4720 are combined and transferred to a decoder as a bitstream.

Figure 48:
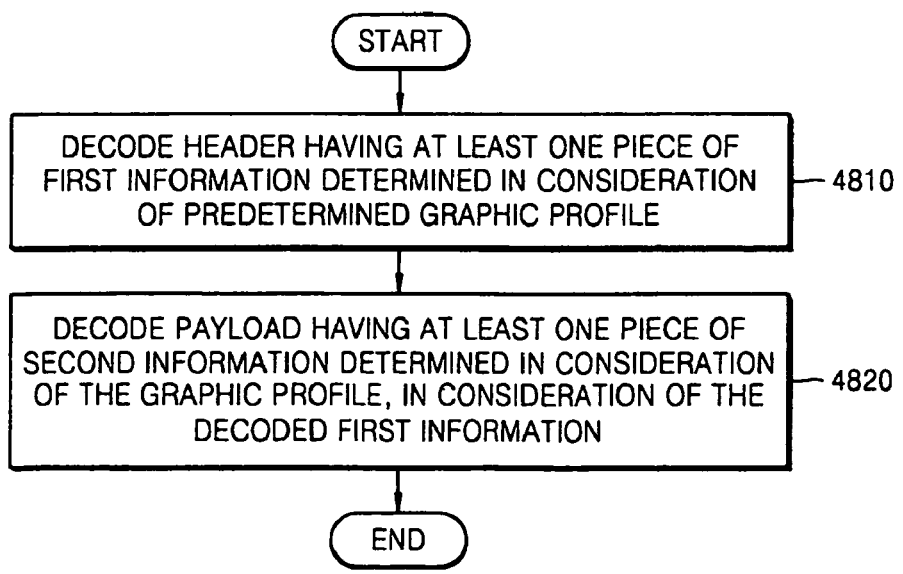
FIG. 48 is a flowchart of a graphic data decoding method according to an embodiment of the present invention.

FIG. 48 is a flowchart of a graphic data decoding method according to an embodiment of the present invention. The method may include operations 4810 and 4820 of completely decoding a bitstream irrespective of a method used to encode the bitstream.

The header decoding unit 510 decodes the header having at least one piece of first information determined in consideration of the predetermined graphic profile (operation 4810).

After operation 4810, the payload decoding unit 520 decodes the payload having at least one piece of second information determined in consideration of the predetermined graphic profile, in consideration of the first information decoded in operation 4810 (operation 4820).

As a result of the decoding in operation 4820, rendering of the restored model data is completed.

A computer program for the above-described graphic data encoding method according to the present invention can be stored in a computer readable recording medium. Similarly, a computer program for the above-described graphic data decoding method according to the present invention may be stored in a computer readable recording medium. In addition, graphic data according to the present invention may be stored in a computer readable recording medium.

Examples of such computer readable recording media include magnetic storage media (e.g., ROM, floppy disks, hard disks, etc.), optical recording media (e.g., CD-ROMs, or DVDs), and storage media such as carrier waves (e.g., transmission through the Internet).

As described above, a graphic data encoding method and apparatus, which are in accordance with a predetermined graphic profile (for example, the Core 3D Compression Profile) generates a bitstream consisting of a header and a payload. The bitstream is generated by encoding as the header only at least one piece of first information determined according to the predetermined graphic profile, from among multiple pieces of first information that can be included in the header, and encoding as the payload only at least one piece of second information determined according to the predetermined graphic profile, from among multiple pieces of second information that can be included in the payload. Thus, the graphic data encoding method and apparatus according to the present invention, which are in accordance with the predetermined graphic profile can always generate an identical bitstream provided that 3D mesh models that are to be encoded are the same even when the encoding method and apparatus can provide various functions.

Accordingly, a graphic data decoding method and apparatus according to the present invention, which are in accordance with the predetermined graphic profile can always completely decode the bitstream generated by the graphic data encoding method and apparatus, which is in accordance with the predetermined graphic profile, even when the encoding method and apparatus provide various functions.

In other words, according to the present invention, irrespective of the functions that can be performed by a graphic data encoding apparatus and the functions that can be performed by a graphic data decoding apparatus, the graphic data decoding apparatus, which is in accordance with the predetermined graphic profile can completely restore a 3D mesh model described in a bitstream generated by the graphic data encoding apparatus that is in accordance with the predetermined graphic profile.

Furthermore, according to the present invention, although the contents of a header and a payload vary according to the kind of the predetermined graphic profile, graphic data always consists of a header and payload irrespective of the kind of the predetermined graphic profile. Thus, according to the present invention, a bitstream is generated by encoding graphic data always in the same format in consideration of the kind of the predetermined graphic profile, and the generated bitstream is completely decoded. As a result, the above-described advantages are achieved irrespective of the contents of the predetermined graphic profile.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of generating graphic data comprising:
    generating a header including at least one piece of first information that is inevitably included irrespective of a predetermined graphic profile, and at least one piece of first information that is optionally included according to the graphic profile; and
    generating, performed by using at least one processing device, a payload including at least one piece of second information that is inevitably included irrespective of the graphic profile, and at least one piece of second information that is selectively included according to the graphic profile.

2. The method of claim 1, wherein the at least one piece of first information that is selectively included comprises:
    first information prescribing at least one inherent function of the graphic profile; and
    first information on the at least one inherent function of the graphic profile.

3. The method of claim 2, wherein the at least one inherent function comprises an order information maintenance function and an improved texture mapping function.

4. The method of claim 1, wherein the at least one piece of second information that is selectively included comprises second information on at least one inherent function of the graphic profile.

5. The method of claim 4, wherein the at least one inherent function comprises an order information maintenance function.

6. The method of claim 1, wherein the predetermined graphic profile is one of Core 3D compression profile, a graphic profile with 3DMC and a graphic profile with 3DMC extension.

* * * * *